United States Patent
Park et al.

(10) Patent No.: US 7,156,632 B2
(45) Date of Patent: Jan. 2, 2007

(54) INJECTION MOLD FOR DISPLAY PANEL OF WASHING MACHINE

(75) Inventors: Hye Yong Park, Changwon-si (KR); Dong Ha Choi, Busan (KR); Sung Rak Kong, Busan (KR); Dong In Kim, Changwon-si (KR)

(73) Assignee: LG Electronics, Inc., Seoul (KR)

( * ) Notice: Subject to any disclaimer, the term of this patent is extended or adjusted under 35 U.S.C. 154(b) by 317 days.

(21) Appl. No.: 10/722,391

(22) Filed: Nov. 28, 2003

(65) Prior Publication Data

US 2004/0156937 A1 Aug. 12, 2004

(30) Foreign Application Priority Data

Nov. 28, 2002 (KR) ............... 10-2002-0075052

(51) Int. Cl.
*B29C 45/14* (2006.01)
(52) U.S. Cl. ............... 425/112; 425/116; 425/123; 425/127
(58) Field of Classification Search ............... 425/116, 425/123, 125, 127, 129.1, 112; 264/261, 264/266
See application file for complete search history.

(56) References Cited

U.S. PATENT DOCUMENTS

| | | | | |
|---|---|---|---|---|
| 3,175,249 A | * | 3/1965 | Ferreira | 425/119 |
| 4,752,059 A | * | 6/1988 | Oishi et al. | 249/95 |
| 4,860,425 A | * | 8/1989 | Kunisaki et al. | 29/527.4 |
| 5,030,407 A | * | 7/1991 | Mollet et al. | 264/261 |
| 5,164,144 A | * | 11/1992 | Rose | 264/511 |
| 5,417,905 A | * | 5/1995 | Lemaire et al. | 264/139 |
| 5,618,567 A | * | 4/1997 | Hara et al. | 425/111 |
| 6,573,463 B1 | * | 6/2003 | Ono | 200/5 A |
| 2002/0005791 A1 | * | 1/2002 | Ono | 341/22 |
| 2002/0171163 A1 | * | 11/2002 | Barsby | 264/45.9 |
| 2005/0035491 A1 | * | 2/2005 | Bagnall et al. | 264/272.11 |

* cited by examiner

*Primary Examiner*—Robert B. Davis
(74) *Attorney, Agent, or Firm*—Fleshner & Kim, LLP

(57) ABSTRACT

Disclosed is an injection mod for a display panel of a washing machine, by which the display panel can be simply formed in one body. The present invention includes a first mold having a first film attached to an inside and a second mold assembled to the first mold to form a cavity with the first mold, the second mold having a second film attached to an inside, the second mold having a gate communicating with an opening provided to the second film.

18 Claims, 6 Drawing Sheets

INJECTION MOLD FOR DISPLAY PANEL OF WASHING MACHINE

This application claims the benefit of Korean Application(s) No. 10-2002-0075052 filed on Nov. 28, 2002 which is/are hereby incorporated by reference.

BACKGROUND OF THE INVENTION

1. Field of the Invention

The present invention relates to a mold, and more particularly, to an injection mod for a display panel of a washing machine.

2. Discussion of the Related Art

Generally, a washing machine is an apparatus for removing contaminating particles attached to the laundry, e.g., clothes, linen, etc., using reaction between water and detergent. A control panel and a display panel are provided at one side of a cabinet of a washing machine to facilitate to operate the washing machine. A control panel 10 and a display panel 20 are explained in detail by referring to FIG. 1 and FIG. 2 as follows.

FIG. 1 is a perspective view of a control panel 10 provided on a topside of a cabinet 1 of a washing machine according to a related art.

Referring to FIG. 1, a printed circuit board (PCB) 15 is installed on one side, e.g., lower side, of a control panel 10. Parts and switches for controlling various elements of a washing machine and light-emitting parts 17 such as LED, etc. are formed on the printed circuit board 15. And, a display device 16 for providing a user with information is provided to the printed circuit board 15 as well.

A support part 11 is formed concave at a central portion of an upper face of the control panel 10, and the control panel 10 is installed on the support part 11. And, an opening 11a is provided at a central portion of the support part 11 to be penetrated by a switch 14 and the like, which are installed on the printed circuit board 15 under the control panel 10. Moreover, a first groove 12 and a second groove 13 are provided to the support part 11 of the control panel 10 to support the display panel 20.

The display panel 20, as shown in FIG. 2, is installed on the support part 11. The display panel 20 consists of a fixing panel 22, a film 21, and a printed panel 23.

The fixing panel 22 is installed on the control panel 10. A window 22a is provided to the fixing panel 22 so that a user can receive information displayed on the display device 16 through the window 22a. Of course, light emitted from the light-emitting body 17 can be carried to the user through the window 22a as well.

A plurality of holes 22b are provided to the fixing panel 22 to be penetrated by the switches 14, respectively. An edge of the fixing panel is bent to be fitted to the first groove 12 to be fixed thereto.

The film 21 is attached on an upper surface of the fixing panel 22, and is formed of PC (polycarbonate) resin or PET (polyethylene terephthalate) resin based material for example. The film 21 includes buttons 21a protruding upward. Heat is appled to the flat film 21, and vacuum absorption or pressing is then performed on the heated film to form the convex buttons 21a.

Each button 21a is provided to a portion of the film 21 confronting the corresponding hole 22b. Hence, once a user presses the button 21a, the switch 14 penetrating the hole 22b is pressed.

The film 21 can be attached to the fixing panel 22 in various ways. For instance, a binder is coated on a backside of the film 21 and the film 21 is then attached to the fixing panel 22. For another instance, the film 21 having its backside coated with the binder is loaded in a mold for forming the fixing panel 22, and synthetic resin is injected in the mold. In this case, the fixing panel 22 and the film 21 are formed in one body.

The printed panel 23 is provided under the fixing panel 22, i.e., between the fixing panel 22 and the support part 11 of the control panel 10. Characters, numbers, and symbols are printed on the printed panel 23. When the printed panel 23 lies beneath the fixing panel 22, a beautiful exterior appears thereon.

Meanwhile, a circumference of the printed panel 23 is bent downward, and a tip of the bent portion of the printed panel 23 is fitted to the second groove 13 to be fixed thereto. Apertures 23a are provided to the fixed printed panel 23 to be penetrated by the switches 14, respectively.

Once the control and display panels 10 and 20 are provided to one side of the cabinet 1 of the washing machine, the user presses the button 21a to conveniently control an operation of the washing machine. Meanwhile, the user is informed of information via the display device 16, thereby controlling the operation of the washing machine with ease.

However, the related art display panel has the following problems or disadvantages.

First of all, the printed panel 23 is disposed under the fixing panel 22 and is then fixed thereto. For this, a complicated configuration is needed. Namely, the circumference of the printed panel 23 has to be bent downward. And, the second groove 13 has to be provided to the support part 11 of the control panel 10. Moreover, the fixing panel 22 and the printed panel 23 are separately formed by injection molding. They are then assembled to the support part 11 of the control panel 10 respectively. Hence, the related art has difficulty in preparation and assembling as well as costs a great deal.

Secondly, there exists a gap between the fixing and printed panels 22 and 23, whereby dampness may flow in the gap on operating the washing machine. In this case, the user is unable to discern the contents printed on the printed panel 23.

SUMMARY OF THE INVENTION

Accordingly, the present invention is directed to an injection mold for a display panel of a washing machine that substantially obviates one or more of the problems due to limitations and disadvantages of the related art.

An object of the present invention, which has been devised to solve the foregoing problem, lies in providing an injection mold for a display panel of a washing machine, by which the display panel can be simply formed in one body.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided an injection mold for a display panel of a washing machine including a first mold having a first film attached to an inside and a second mold assembled to the first mold to form a cavity with the first mold, the second mold having a second film attached to an inside, the second mold having a gate communicating with an opening provided to the second film.

The first mold may include at least one recess provided to a surface adjacent to the cavity to make the first film locally convex on injection molding.

Preferably, a diameter of the opening is greater than that of the gate.

The second mold may include a protrusion protruding from a surface adjacent to the cavity to have an outlet of the gate at a central portion. In this case, the protrusion may be fitted to the opening. Preferably, an upper surface of the protrusion and an upper surface of the second film lie in one plane.

The second mold may include a second recess to which the second film is fitted to be fixed thereto.

And, the second mold may include at least one projection extending from a surface adjacent to the cavity to penetrate the second film to be brought contact with the first film.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A is a cross-sectional view of an injection mold and films according to the present invention;

FIG. 5B is a cross-sectional view of films attached to an injection mold;

FIG. 5C is a cross-sectional view of an assembled injection mold; and

FIG. 5D is a cross-sectional view of an injection mold having synthetic resin injected therein.

DETAILED DESCRIPTION OF THE PREFERRED EMBODIMENT(S)

Reference will now be made in detail to the preferred embodiment(s) of the present invention, examples of which are illustrated in the accompanying drawings. Throughout the drawings, like elements are indicated using the same or similar reference designations where possible.

Figure 1:
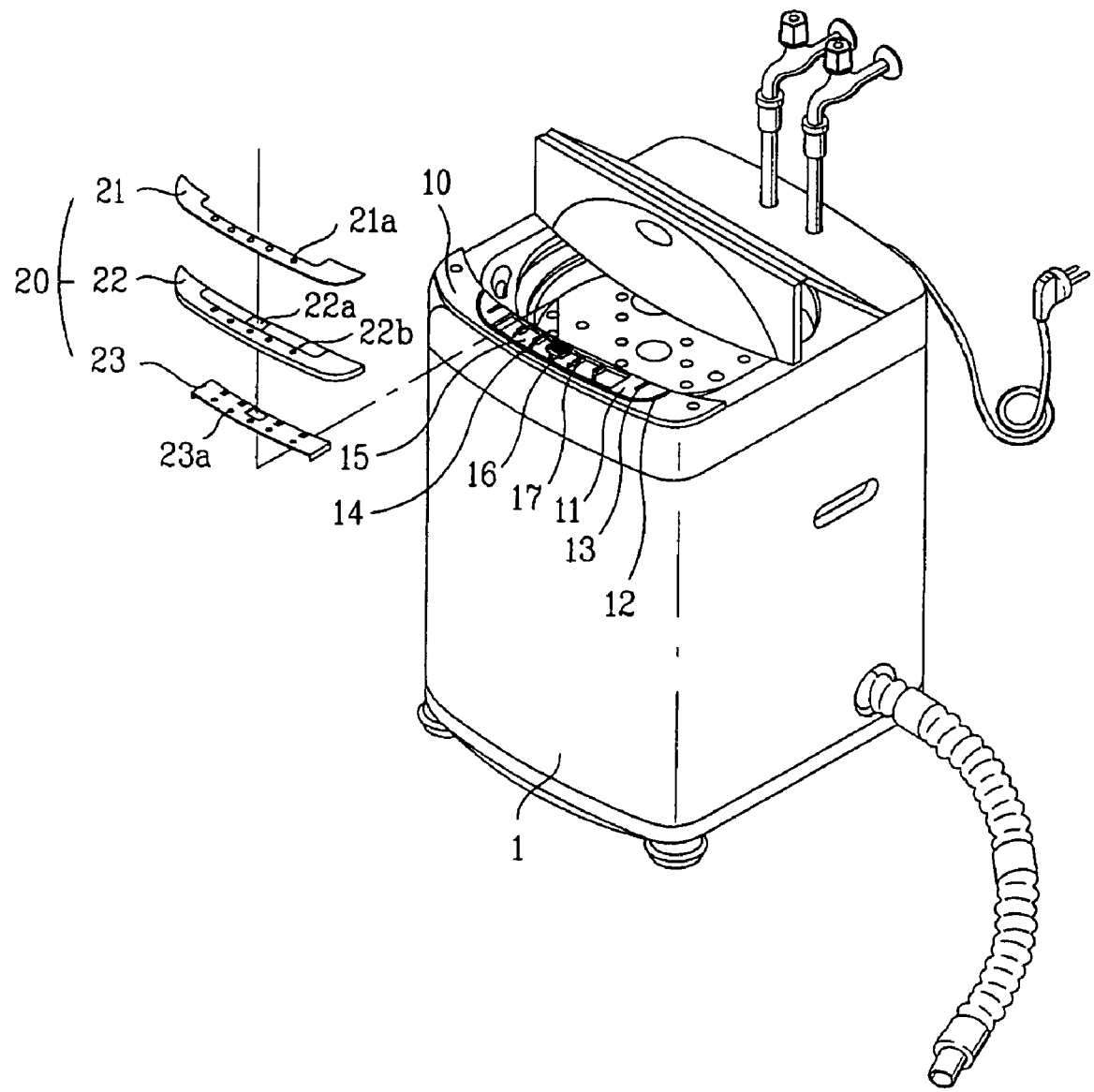
FIG. 1 is a perspective view of a control panel provided on a topside of a cabinet of a washing machine according to a related art.
Figure 2:
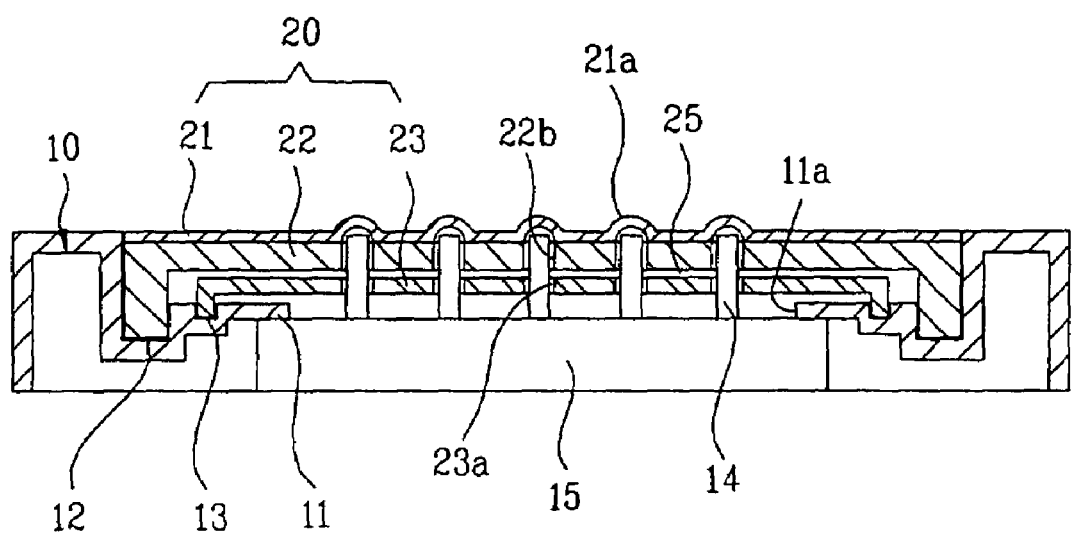
FIG. 2 is a cross-sectional view of an assembly of a control panel and a display panel of a washing machine in FIG. 1.
Figure 3:
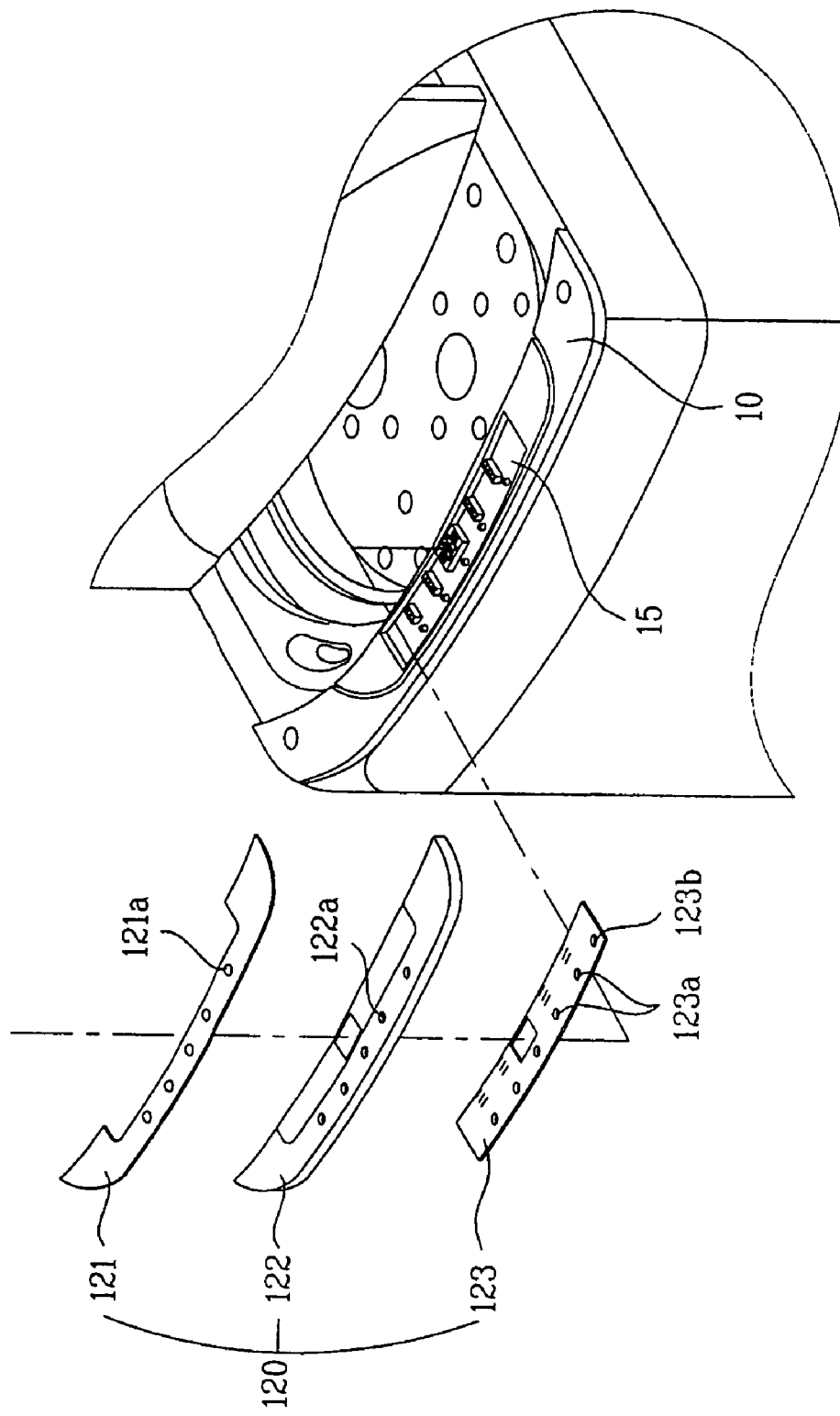
FIG. 3 is a perspective view of a washing machine according to the present invention.

Referring to FIG. 3, a display panel 120 according to the present invention includes a fixing panel 122, a first film 121 provided on an upper surface of the fixing panel 122, and a second film 123 provided to a lower surface of the fixing panel 122. In this case, the constructions of the first film 121 and the fixing panel 122 are similar to those of FIG. 1 and FIG. 2. So, their explanation is skipped in the following. Yet, the second film 123 plays a role of the related art printed panel 23 in FIG. 1 and FIG. 2, thereby being explained as follows.

Characters, numbers, and symbols are printed on the second film 123. Hence, a user refers to information printed on the second film 123 to operate the washing machine.

The second film 123 is preferably formed in one body when the fixing panel 122 is formed, instead of being separately attached to the fixing panel 122. Namely, in forming the fixing panel 122, the first and second films 121 and 123 are interposed in a cavity of a mold and resin 300 is then injected in the mold to be solidified. Thus, the first and second films 121 and 123 and the fixing panel 122 are simultaneously formed in one body.

Figure 4:
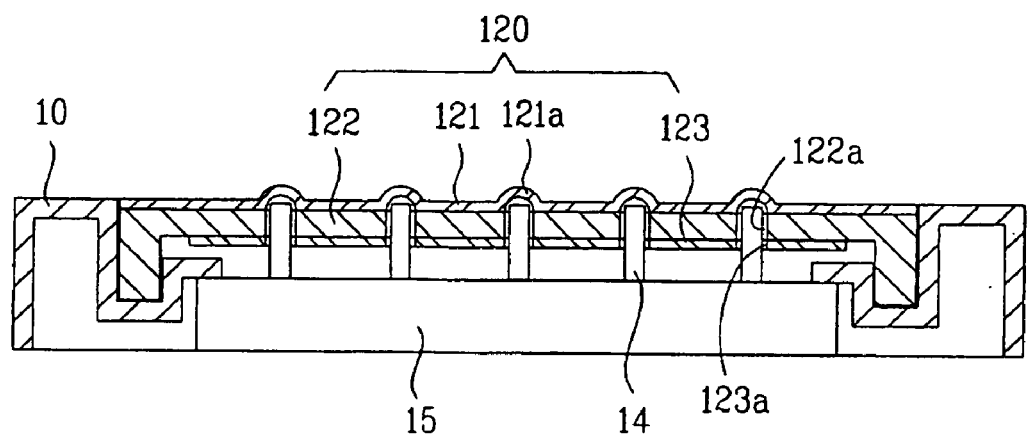
FIG. 4 is a cross-sectional view of an assembly of a control panel and a display panel of a washing machine in FIG. 3.

In the present invention, because the display panel 120, as shown in FIG. 4, is formed in one body, there exists no gap between the fixing panel 122 and the second film 123. Hence, the dampness problem of the related art is overcome, whereby the user has no difficulty in reading the printed characters and the like of the second film 123 at all.

Moreover, the present invention need not form the related art second groove at the control panel 10. And, the circumference of the second film 123 is not bent in the present invention. Hence, the control and display panels 10 and 20 are easily prepared to increase productivity.

Meanwhile, in case that the resin 300 is injected between the first and second films 121 and 123 after the first and second films 121 and 123 are interposed in the cavity of the mold, the second film 123 may be moved by the flowing resin 300. In such a case, the second film 123 may deviate from an accurate position to spoil the exterior beauty thereof. Hence, an improved structure is needed to overcome such a problem.

The present invention provides an injection mold having an improved structure preventing the second film 123 from moving on injecting the resin 300 in the cavity of the mold.

An injection mold for a display panel for a washing machine is explained in detail by referring to FIGS. 5A to 5D as follows.

A mold according to the present invention includes a first mold 100 and a second mold 200. The first and second molds 100 and 200 are detachable from each other. There is provided a cavity 150 between the first and second molds 100 and 200 when the first and second molds 100 and 200 are assembled. In this case, the cavity 150 contours a figure of the fixing panel 122.

A gate 210, via which the resin 300 is injected, is provided to the second mold 200. One end of the gate 210 adjacent to the cavity 150 is called 'outlet', and the other end of the gate 210, via which the resin 300 is injected, is called 'inlet'. Meanwhile, a riser 215 is provided to the inlet of the gate 210 to have a diameter greater than that of the gate 210.

Figure 5A:
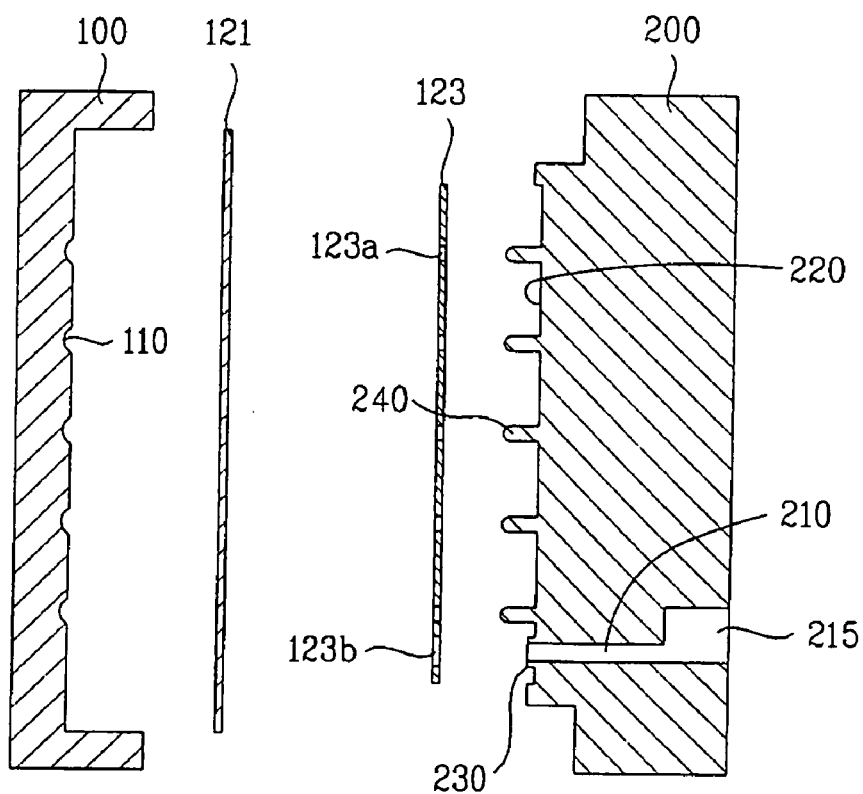
FIGS. 5A to 5D are cross-sectional views of forming a display panel in FIG. 3 using a mold.
Figure 5B:
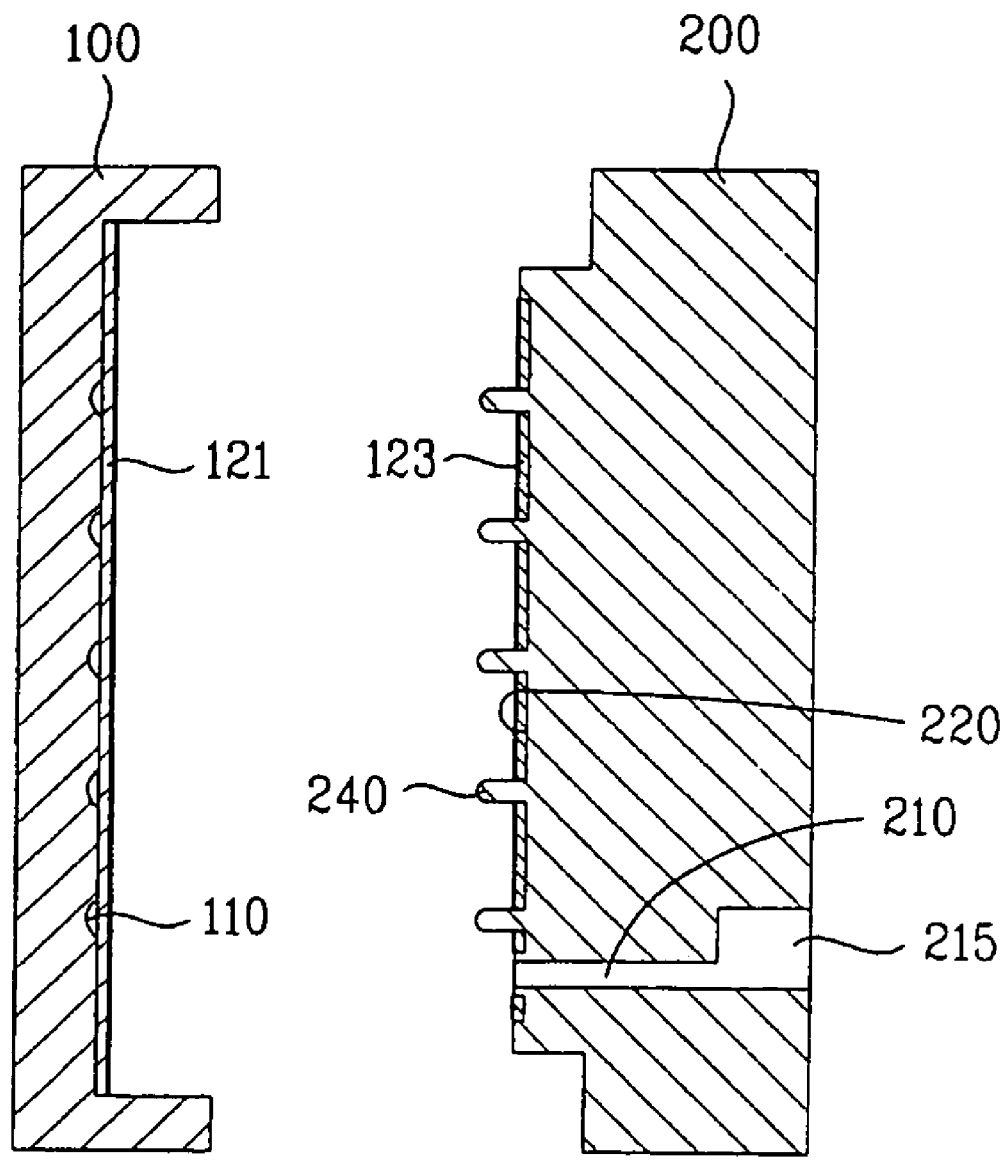
Figure 5C:
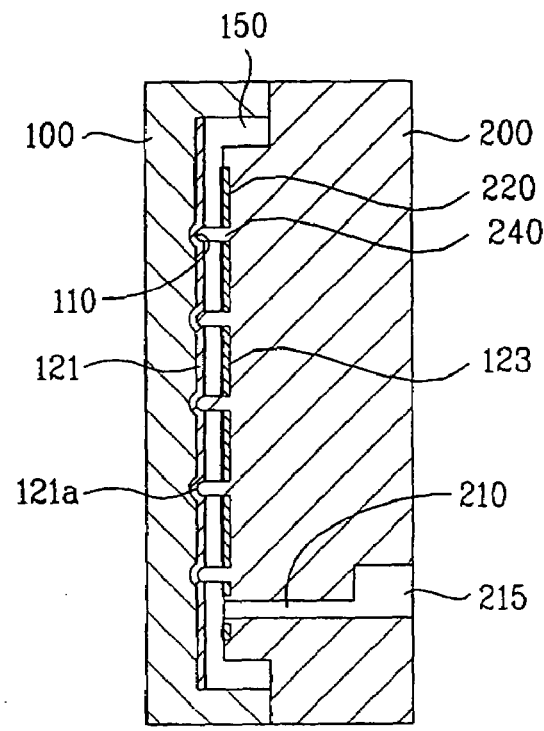

Referring to FIG. 5B, the first film 121 is attached to the first mold 100 and the second film 123 is attached to the second mold 200. An opening 123*b* is provided to one side of the second film 123. The opening 123*b* communicate with the inlet of the gate 210.

The resin 300 flowing in the gate 210 passes the opening 123*b* to move toward the first film 121, fills the cavity 150 gradually, and moves toward the second film 123, in turn. Hence, it is able to prevent the second film 123 from moving effectively.

Moreover, a diameter of the opening 123*b* is preferably greater than that of the gate 210. Thus, it is able to prevent more effectively the second film from being pushed by the resin 300 that is being injected via the outlet of the gate 210.

Meanwhile, at least one first recess 110 may be provided to a surface of the first mold 100 adjacent to the cavity 150. The first recess 110 is provided to make the first film 121 convex locally on forming the display panel 120. The convex portion of the first film 121 adhering closely to the first recess 110 becomes the button 121a in FIG. 4.

The button 121a may be formed before forming the display panel 120 in one body or on forming the display panel 120.

In the former case, after the button has been formed on the first film 121 by pressing or vacuum adsorption, the display panel 120 is formed in one body using the first and second molds 121 and 123. In this case, the display panel 120 is formed in one body while the button 121a formed at the first film 121 adheres closely to the first recess 110.

In the latter case, a portion of the first film 121 comes into adhering closely to the first recess 110 by a pressure of the resin 300 injected into the cavity 150, thereby forming the button 121a. Yet, in this case, the hole 122a to be penetrated by the switch 14 should be separately formed at the fixing panel 122 using a drill or the like. Hence, in forming the display panel 120 in one body, an improved structure enabling to form both of the hole 122a and the button 121 simultaneously is needed.

The present invention proposes to provide a projection 240 to the second mold 200. The projection 240 extends from a surface adjacent to the cavity 150, and an end of the projection 240 penetrates the second film 123 to be brought contact with the first film 121. For this, an aperture 123a is provided to the second film 123 to be penetrated by the projection 240. In this case, when the display panel 120 is installed on the control panel 10, the switch 14 passes the aperture 123a and the hole 122a, in turn.

The end of the projection 240 presses the first film 121 so that the first film adheres tightly to the first recess 110. Hence, after the resin 300 injected in the cavity 150 has been solidified, the portion adhering tightly to the first recess 110 becomes the button 121a.

Thus, if the projection 240 is provided to the second mold 200, the hole 122a and button 121a can be simultaneously formed in forming the display panel 120. Hence, the present invention facilitates to prepare the display panel, enhances productivity, and reduces product costs.

Meanwhile, a protrusion 230 protruding from a surface of the second mold 200 adjacent to the cavity 150 may be further provided to the second mold 200. In this case, the outlet of the gate 210 is located at a center of the protrusion 230. The protrusion 230 is fitted to the opening 123b to be fixed thereto.

Since the second film 123 is fixed by the protrusion 230, the second film 123 is more effectively prevented from moving when the resin 300 is injected into the cavity 150.

Moreover, an upper surface of the protrusion 230 and an upper surface of the second film 123 may lie in the same plane. If so, the resin 300 flowing in the cavity 150 via the outlet of the gate 210 fails to push the second film 123 in right-to-left directions or toward the first film 121. Hence, it is able to prevent the second film 123 from moving.

A second recess 220, as shown in FIG. 5A, may be further provided to the second mold 200. The second recess 220 is formed at a surface of the second mold 200 adjacent to the cavity 150 so that the second film 123 is fitted to the second recess 220 to be fixed thereto. As the second film 123 is securely fixed to the second recess 220 when the resin 300 is injected in the cavity 150 for forming the fixing panel 122 by injection molding, it is able to form the display panel 120 to which the second film 123 is accurately attached.

A process of forming the display panel 120 by injection molding using the injection mold according to the present invention is explained as follows.

First of all, after the binder is coated on one surface of the first film 121, the first film 121, as shown in FIG. 5B, is attached to the first mold 100. In this case, the binder-coated surface of the first film 121 confronts the second mold 200.

After the binder is coated on one surface of the second film 123, the second film 123 is fitted to the second recess 220 of the second mold 200 to be fixed thereto. Hence, the circumference of the second film 123 is fitted to the second recess 220 to be fixed thereto, the projection 240 is fitted to the aperture 123a to be fixed thereto, and the protrusion 230 is fitted to the opening 123b to be fixed thereto. Therefore, the second film 123 is very securely attached to the second mold 200. Meanwhile, the binder-coated surface of the second film 123 confronts the first film 121.

After the first and second films 121 and 123 are attached to the first and second molds 100 and 200, respectively, the first and second molds 100 and 200, as shown in FIG. 5B, are assembled to each other. The cavity 150 is then provided between the first and second molds 100 and 200, and the projection 240 presses the first film 121 to make the first film 121 adhere tightly to the first recess 110.

Figure 5D:
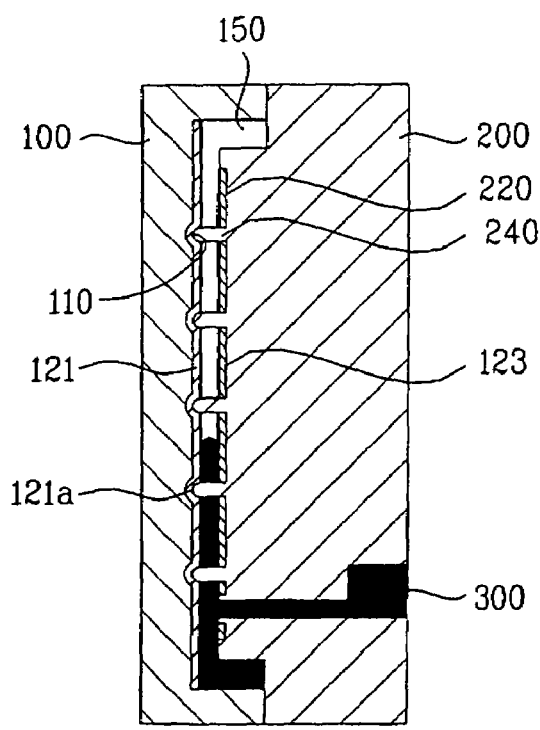

After the first and second molds 100 and 200 are assembled, the melted resin 300, as shown in FIG. 5D, is injected into the cavity 150 via the gate 210 to fill up the cavity 150. In this case, the binder coated on the first and second films 121 and 123 melts by high temperature. Hence, when the resin 300 is solidified, the first and second films 121 and 123 are securely attached to a part that the resin 300 filling up the cavity 150 is solidified, i.e., the fixing panel 122.

Meanwhile, completely fixed to the second mold 200 when the resin 300 is injected into the cavity 150, the second film 123 fails to move. Besides, the projection 240 makes the first film 121 adhere tightly to the first recess 110, whereby the first film 121 is securely fixed to the first mold 100 as well. Hence, the first and second films 121 and 123 are accurately attached to correct positions.

After the resin 300 injected into the cavity 150 has been solidified, the first and second molds 100 and 200 are separated from each other to provide the completed display panel 120. For reference, the button 121a is formed at the portion where the projection 240 presses the first film 121 to the first recess 110 and the portion occupied by the projection 240 becomes the hole 122a.

Accordingly, the present invention has the following advantages or effects.

First of all, one complete display panel can be formed in one body by one process. Therefore, the present invention facilitates to form the display panel as well as enhances productivity.

Secondly, the first and second films fail to move while the resin is injected into the cavity, whereby the display panel having the first and second films attached to the accurate positions can be formed. Therefore, the present invention reduces product failure to save product costs.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. An injection mold of a display panel of an appliance, comprising:
a first mold configured to receive a first film on an inner surface thereof, the first mold having at least one recess; and
a second mold configured to receive a second film on an inner surface thereof, the second mold having at least one recess for making a mold cavity with the recess of the first mold, wherein at least one projection is formed on the inner surface of the second mold and at least one corresponding recess is formed on the inner surface of the first mold such that the projection, is configured to push a portion of the first film into the corresponding recess so as to form a convex portion on the first film configured to receive a button.

2. The injection mold as claimed in claim 1, wherein a gate is formed in the second mold to allow a molding resin to be injected into the mold cavity through the gate.

3. The injection mold as claimed in claim 2, wherein a protrusion is formed on the inner surface of the second mold surrounding the location where the gate penetrates the inner surface of the second mold.

4. The injection mold as claimed in claim 3, wherein a height of the protrusion is such that an upper surface of the protrusion and an upper surface of a second film on the inner surface of the second mold lie in substantially the same plane.

5. The injection mold as claimed in claim 1, wherein the at least one projection is configured to hold a portion of a first film on an inner surface of the first mold in a corresponding recess of the first mold while resin is injected into the first mold such that the heat of the molding process causes the first film to be permanently deformed into a convex portion that extends into the recess on the first mold.

6. The injection mold as claimed in claim 5, wherein the at least one projection is also configured to form an aperture in resin injected into the mold during a molding process such that the aperture opens onto the convex portion of the first film.

7. The injection mold as claimed in claim 6, wherein the at least one recess comprises a plurality of recesses, and wherein the at least one projection comprises a plurality of projections that correspond to the plurality of recesses.

8. The injection mold as claimed in claim 1, wherein the at least one recess comprises a plurality of recesses, and wherein the at least one projection comprises a plurality of projections that correspond to the plurality of recesses.

9. The injection mold as claimed in claim 1, wherein the at least one projection extending from the inner surface of the second mold is also configured to penetrate a second film located on the inner surface of the second mold.

10. An injection mold for forming a display panel of an appliance, comprising:
a first mold configured to receive a first film on an inner surface thereof; and
a second mold configured to receive a second film on an inner surface thereof, wherein a mold cavity is formed between the inner surfaces of the first and second molds when the first and second molds are closed together, wherein at least one projection is formed on the inner surface of the second mold, wherein the at least one projection is configured to pass through a second film on the inner surface of the second mold and to abut the first film on the inner surface of the first mold when the molds are closed together, and wherein the at least one projection is configured to form an aperture in resin injected into the mold during a molding process such that the aperture opens onto the first film.

11. The injection mold as claimed in claim 10, wherein at least one recess is formed on the inner surface of the first mold.

12. The injection mold as claimed in claim 11, wherein an end of the at least one projection is configured to press a portion of the first film into the at least one recess when the first and second molds are closed together.

13. The injection mold as claimed in claim 10, wherein the second mold comprises a gate to allow molding resin to be injected into the mold cavity, and wherein a protrusion is formed on the inner surface of the second mold surrounding the gate.

14. The injection mold as claimed in claim 13, wherein a height of the protrusion surrounding the gate is such that an upper surface of the protrusion and an upper surface of a second film on the inner surface of the second mold lie in substantially the same plane.

15. The injection mold as claimed in claim 10, wherein the second mold comprises a second recess which is configured to receive the second film.

16. The injection mold as claimed in claim 12, wherein the at least one projection is configured to hold a portion of a first film on an inner surface of the first mold in a corresponding recess of the first mold while resin is injected into the first mold such that the heat of the molding process causes the first film to be permanently deformed into a convex portion that extends into the recess on the first mold.

17. The injection mold as claimed in claim 16, wherein the at least one projection is configured to form an aperture in molding resin injected into the mold during a molding process such that the aperture open onto the convex portion.

18. The injection mold as claimed in claim 16, wherein the at least one recess comprises a plurality of recesses, and wherein the at least one projection comprises a plurality of projections that correspond to the plurality of recesses.

* * * * *